July 8, 1969

J. T. NEWCOMB 3,453,943

PHOTOGRAPHIC CAMERA AND LEVELING MEANS THEREFOR

Filed April 22, 1966

INVENTOR.
JOSIAH T. NEWCOMB
BY
Ward, Haselton, McElhannon, Orne, Brookes, Fitzpatrick
ATTORNEYS July 8, 1969   J. T. NEWCOMB   3,453,943
PHOTOGRAPHIC CAMERA AND LEVELING MEANS THEREFOR
Filed April 22, 1966
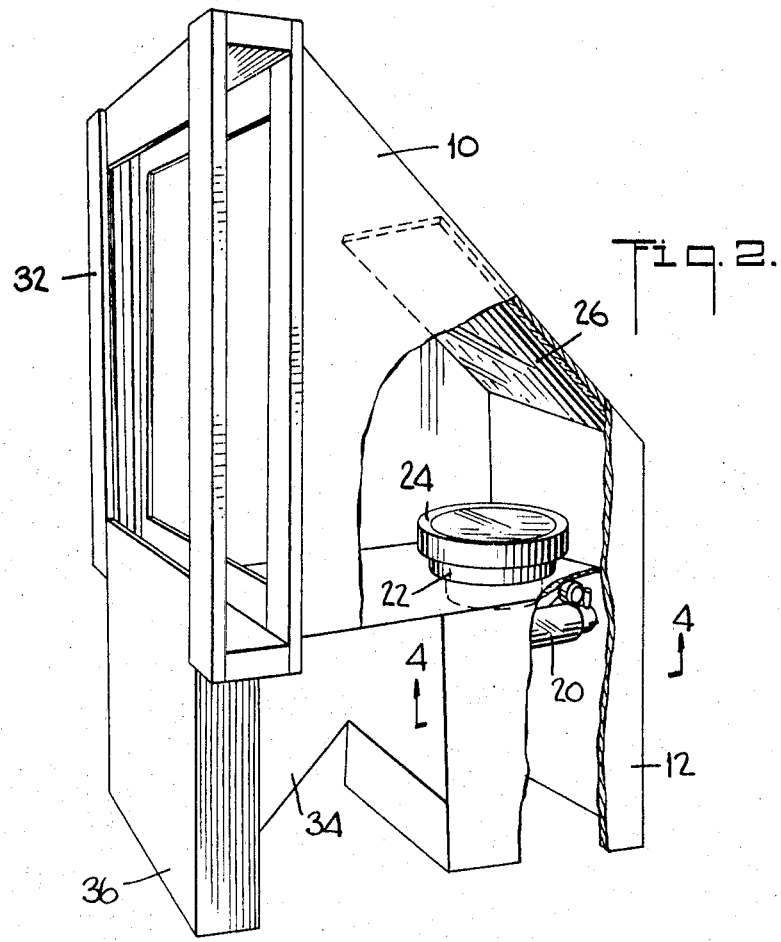
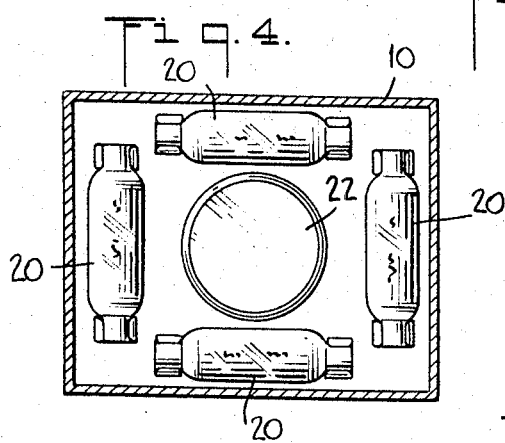
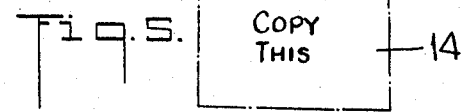
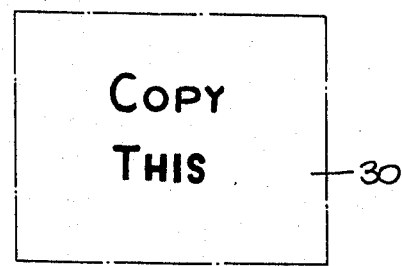
INVENTOR.
JOSIAH T. NEWCOMB
BY
ATTORNEYS United States Patent Office 3,453,943
Patented July 8, 1969

3,453,943
PHOTOGRAPHIC CAMERA AND LEVELING MEANS THEREFOR
Josiah T. Newcomb, R.D. 5, Brooks Road, Binghamton, N.Y. 13905
Filed Apr. 22, 1966, Ser. No. 544,585
Int. Cl. G03b 19/02, 13/24, 13/26
U.S. Cl. 95—11                                      3 Claims

ABSTRACT OF THE DISCLOSURE

A camera having a housing positionable on a surface to be copied. The surface to be copied, lens, diaphragm, and mirror are positioned in linear relationship and an image receiving means is disposed at about 90 degrees with respect thereto. The surface to be copied, lens, diaphragm, mirror, and image receiving means are all positioned with respect to each other so that the image receiving surface receives an image substantially larger than the surface being copied. The housing has a stabilizing foot on the lower end thereof which engages the surface being copied so that the camera is self-supporting.

---

This invention relates to a camera and more particularly to a camera copying documents.

The camera according to this invention is particularly adapted, among other possible uses, for use to meet specific needs of certain order and catalog procedures of libraries, such as providing enlarged copy of material published in reduced form to enable catalogers and typists to utilize the published material with ease and accuracy. Typically, librarians use an established bibliographic entry as a model and guide for their own cataloging. Frequently, the model entry is only available in greatly reduced form. It is desirable that the cataloger have an enlarged copy of the established entry at hand and on it to make the necessary corrections, additions, and deletions. The modified copy is then turned over to a typist who types the cards for the public catalog, shelflist, and the like.

Other uses of the camera according to this invention include providing enlarged copy of postage stamps, and producing readable copy of opaque microprints or microcards. The latter is primarily a library application where there is an increasing quantity of material appearing on microcards. These cards are generally 3 x 5, 5 x 7, or 8 x 10 inches and upon which there are from 35 to more than 100 pages of text material, each page of text being reduced to about ¼ the size of a postage stamp. Reading machines are common, but there is presently no satisfactorily device for quickly and inexpensively making a legible copy.

Although a variety of reproducing means are presently available and have been described in the literature, they have not been entirely satisfactory for many different reasons.

According to my invention there is provided a new and improved camera comprising a vertically disposed housing which has a lower end positionable on a surface to be copied. Preferably, the housing is engageable with the surface in substantially a light-tight relationship. Means are provided for illuminating the surface to be copied, and a lens and a diaphragm are mounted on the inside of the housing in spaced relationship with respect to the surface. A mirror is mounted on the inside of the housing in spaced relationship with respect to the lens and diaphragm so the the surface to be copied, lens and mirror are all disposed in substantially linear relationship one with respect to the others. Image receiving means are disposed within the housing spaced from the mirror and at an angle of substantially 90 degrees with respect to the surface, lens and mirror. The mirror is disposed at an angle for receiving an image from the copying surface and reflecting a reversed image to the image receiving means. Further, the surface to be copied, lens, mirror and image receiving means are all positioned one with respect to the others whereby the image received by the image receiving means is substantially larger than the surface being copied. Also, according to the invention the image receiving means may be photographic paper or cut film held in a cut film holder rack.

According to the invention the housing has a stabilizer foot extending in substantially parallel relationship to the lower end of the housing, and in spaced relationship with respect thereto.

A feature of this invention resides in the provision of a new and improved camera which provides enlarged readable copy, thereby saving time and convenience of library staffs, clerks, stenographers, and others.

Another feature of this invention is the provision of a camera which is small, compact and light weight, which is easy to manipulate, and which is placed directly on the book or document to be copied. The fact that the camera is placed on the book rather than the book on the camera reduces wear and tear on the volumes used. Most existing copying devices require that the book be turned over and more or less forceably spread open to obtain a legible copy. This results in considerable wracking of the binding and in more or less "blind" copying. Positioning the camera according to my invention is visually evident and requires no extraordinary pressure on the surface to be copied. Accordingly, its use is safe, yet it does not harm books or other valuable documents being copied. This is particularly important when the documents are rare or fragile.

According to the present invention, as another feature thereof, there is provided a new and improved camera which is a self-contained unit including its own light source, which is economical to purchase, which is simple and inexpensive to operate, and which does not require expensive auxiliary equipment in order for it to function properly.

In addition, a feature of this invention resides in the provision of a novel camera which is effective, reliable, low in weight, convenient, practical and far superior to such existing devices.

There has thus been outlined rather broadly the more important features of the invention in order that the detailed description thereof that follows may be better understood, and in order that the present contribution to the art may be better appreciated. There are, of course, additional features of the invention that will be described hereinafter which will form the subjection of the claims appended hereto. Those skilled in the art will appreciate that the conception upon which this disclosure is based may readily be utilized as the basis for the designing of other structures for carrying out the several purposes of the invention. It is important, therefore, that the claims be regarded as including such equivalent constructions as do not depart from the spirit and scope of the invention.

A specific embodiment of the invention has been chosen for purposes of illustration and description, and is shown in the accompanying drawings, forming a part of the specification, wherein:

FIG. 3 is a vertical, medial sectional view showing the interrelationship of the copying surface, lens, diaphragm, lighting means, mirror, image receiving means, and stabilizing foot;

FIG. 4 is a sectional view taken substantially along the line indicated at 4—4 in FIG. 2;

FIG. 5 is a top plan view of the surface to be copied; and

FIG. 6 is a top plan view of the enlarged copy of the surface of FIG. 5.

Figure 1:
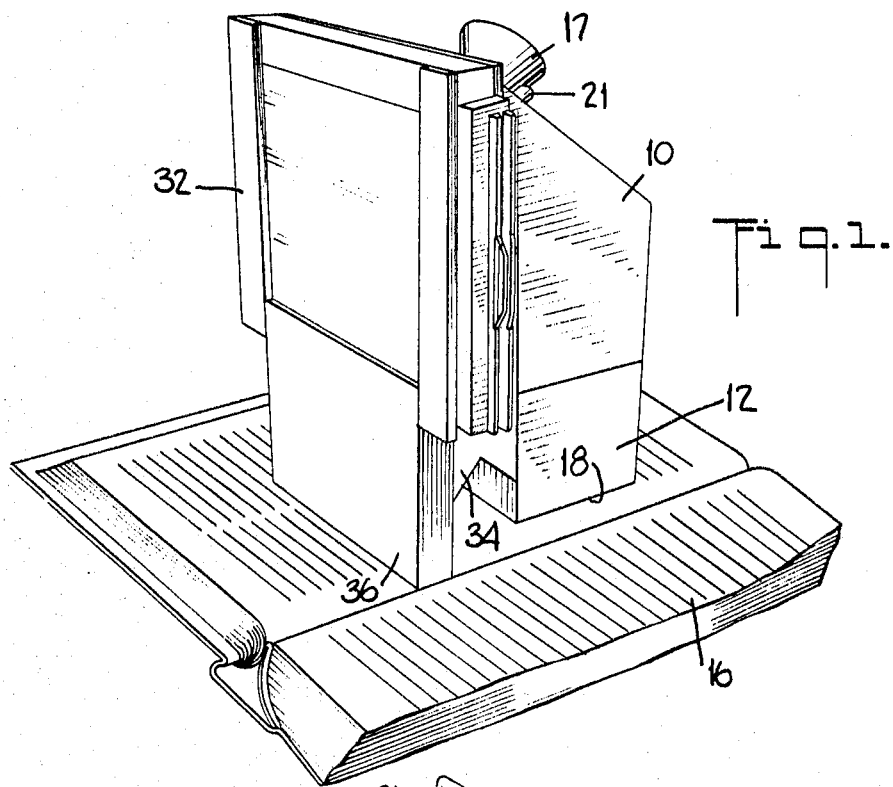
FIG. 1 is a perspective view showing a camera constructed in accordance with the concepts of this invention, positioned on a surface or book to be copied.

In the illustrated embodiment of the invention the camera comprises a housing 10 having a lower end 12 positionable on a surface 14, FIG. 3, to be copied. In operation the camera is manually placed over the particular surface to be copied, and as can readily be seen in FIGS. 1 and 3, the precise portion of the document to be copied is visually evident to the operator so that useless exposures are unlikely. It will be appreciated that the camera is placed on the book, such as book 16, rather than the book or document being placed on the camera. This is a decided advantage in many instances, particularly when the document being copied is a large heavy volume or a rather old frail document. A handle 17, FIGS. 1 and 3, is provided to permit the operator to readily position the camera in the desired location.

As best seen in FIGS. 3 and 4, the device is provided with illuminating means, such as electric light bulbs 20 which are disposed around the inner periphery of the housing 10 and in position for illuminating the surface 14 to be copied. Switching means 21, FIGS. 1 and 3, are provided so that the operator may readily switch the lights on and off, as necessary.

The lower end 12 of the housing 10 is engageable, as at 18, with the surface 14 in a substantially light-tight relationship. This is also particularly advantageous, especially when the copying is being done in a library or other public room so that during exposure the light will not interfere with other persons sitting or working nearby. Also, it reduces the eyestrain upon the opertaor of the device.

Figure 2:
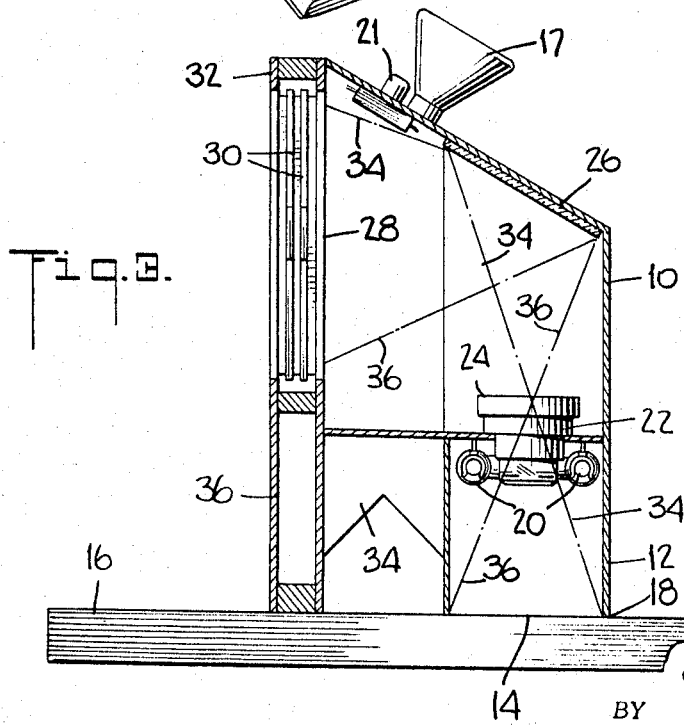
FIG. 2 is an enlarged perspective view partially broken away to reveal the inner components of the camera.

Referring to FIGS. 2 and 3, the image being copied is projected through the lens 22 mounted on the inside of the housing 10 in spaced relationship with respect to the surface 14 to be copied. Thereafter, the image passes through a diaphragm 24 to a mirror 26. The mirror is disposed within the housing 10 in spaced relationship with respect to the lens. It is noted that the surface to be copied, lens, diaphragm and mirror are all disposed in a substantially linear relationship one with respect to the others.

Image receiving means 28 are disposed in said housing, spaced from the mirror 26, and at an angle of substantially 90 degrees with respect to the line formed by the surface to be copied, lens, diaphragm and mirror. The image receiving means is illustrated as being photographic paper or cut film 30 held in a cut film holder rack 32, as seen in FIG. 3.

It will be appreciated that the mirror 26 is disposed at an angle for receiving the image, the peripheries of the image being indicated by the dashed lines 34 and 36 of FIG. 3. Accordingly, it is seen that the image passes from the surface to be copied through the lens 22, the diaphragm 24 to the mirror 26 which reflects the image onto a suitable photographic paper or cut film 30. Hence, the copy produced is reversed as to color, but is directly readable.

Further, the surface to be copied, lens, mirror and image receiving means are all positioned with respect to each other, whereby the image received by the image receiving means is substantially larger than the surface to be copied. This is illustrated in FIGS. 5 and 6, wherein FIG. 5 shows the surface 14 to be copied and FIG. 6 shows the copy made as by the image receiving means 30.

As best seen in FIG. 1, a spacer member 34 interconnects the housing 10 with a stabilizing foot 36 which extends in substantially parallel relationship with respect to the lower end 12 of the housing 10, and in spaced relationship thereto. This stabilizing foot extends downwardly of the film holder rack 32, and engages the book 16 or other document to be copied, as shown. This stabilizer foot renders the camera self-supporting in a stable manner for ease in operation.

The camera exposure can be made under any light conditions. During normal operation, the focus and diaphragm opening are fixed, and for a given diaphragm opening the exposure time is substantially constant. This exposure timing is controlled by the operator, but the precise timing is not critical. The exposure is made by withdrawing the protective slide from the cut film holder or paper carrier and turning on the light source for the required period of time. Thereafter, the light source is turned off and the protective slide is returned to the cut film holder or paper carrier. The exposed photographic paper or cut film is chemically developed and stabilized in a dark room, and the resultant copy is white on black, which is reversed as to color, but is directly readable.

For example, desirable results have been obtained using the following parameters: exposure time two seconds; diaphragm opening $f.8$; and lighting from 12 volt automotive bulbs supplied from a 110 volt household current reduced to 12 volts by a simple filament transformer.

From the foregoing description it will be seen that the present invention does indeed provide an improved camera which effectively meets the objects specified hereinbefore.

Although a certain particular embodiment of the invention is herein disclosed for purposes of explanation, further modification thereof, after study of this specification, will be apparent to those skilled in the art to which the invention pertains. Reference should accordingly be had to the appended claims in determining the scope of the invention.

What is claimed and desired to be secured by Letters Patent is:

1. A camera of the class described, comprising a vertically disposed housing having a lower end positionable on a surface to be copied, means for illuminating said surface to be copied, a lens and a diaphragm mounted on the inside of said housing in spaced relationship with respect to said surface, a mirror disposed within said housing in spaced relationship with respect to the lens; said surface, lens, diaphragm, and mirror being disposed in substantially linear relationship one with respect to the others, image receiving means disposed in said housing spaced from said mirror and at an angle substantially 90 degrees with respect to said surface, lens and mirror; said mirror being disposed at an angle for receiving an image from said surface and directing it to said image receiving means; said surface, lens, mirror and image receiving surface all being positioned with respect to each other whereby the image received by said image receiving means is substantially larger than said surface, said housing having a stabilizing foot extending downwardly of said image receiving means and substantially parallel to said lower end, and in spaced relationship with respect to the lower end.

2. A camera of the class described, comprising a vertically disposed housing having a rectangularly shaped lower end positionable on a surface to be copied, a stabilizing foot extending substantially parallel to said lower end and in spaced relationship with respect thereto, a lens and a diaphragm mounted on the inside of said housing in spaced relationship with respect to said surface, electric light bulbs disposed around the inner perihery of said housing between said surface and said lens for illuminating said surface to be copied, switching means for controlling said light bulbs, said housing being engageable with said surface in substantially light-tight relationship, a mirror disposed within said housing in spaced relationship with respect to the lens, said surface, lens, diaphragm, and mirror being disposed in substantially linear relationship one with respect to the others, cut film held in a cut film holder rack for receiving an image being disposed in said housing spaced from said mirror and at an angle substantially 90 degrees with respect to said surface, lens and mirror; said mirror being disposed at an angle for receiving an image from said surface and directing it to said image cut film; said surface, lens, mirror and cut film all being positioned with respect to each other whereby the image received by said cut film is substantially larger than said surface to be copied.

3. A camera of the class described, comprising a vertically disposed housing having a lower end positionable on a surface to be copied, means for illuminating said surface to be copied, a lens and a diaphragm mounted on the inside of said housing in spaced relationship with respect to said surface, a mirror disposed within said housing in spaced relationship with respect to the lens; said surface, lens, diaphragm, and mirror being disposed in substantially linear relationship one with respect to the others, image receiving means disposed in said housing spaced from said mirror and at an angle substantially 90 degrees with respect to said surface, lens and mirror; said mirror being disposed at an angle for receiving an image from said surface and directing it to said image receiving means; said surface, lens, mirror and image receiving surface all being positioned with respect to each other whereby the image received by said image receiving means is substantially larger than said surface, said lower end being of rectangular shape, a stabilizing foot extending substantially parallel to said lower end and in spaced relationship with respect thereto, said means for illuminating said surface including electric light bulbs disposed around the inner periphery of said housing between said surface and said lens for illuminating said surface to be copied, switching means for controlling said light bulbs, said housing being engageable with said surface in substantially light-tight relationship, and said image receiving means being photographic paper.

References Cited
UNITED STATES PATENTS

| | | | |
|---|---|---|---|
| 1,963,417 | 6/1934 | Petit et al. | 95—11 |
| 2,081,329 | 5/1937 | Gordon | 88—24 |
| 3,263,584 | 8/1966 | Knus | 95—11 |

NORTON ANSHER, *Primary Examiner.*

F. L. BRAUN, *Assistant Examiner.*

U.S. Cl. X.R.

355—44